United States Patent [19]
Chiang et al.

[11] Patent Number: 6,111,051
[45] Date of Patent: *Aug. 29, 2000

[54] PREPARATION OF CONDUCTIVE POLYURETHANES USING A CONDUCTIVE QUASI-SOLUTION

[75] Inventors: Albert C. Chiang, Danbury, Conn.; John A. Roderick, Scituate, R.I.

[73] Assignee: Mearthane Products Corporation, Cranston, R.I.

[*] Notice: This patent is subject to a terminal disclaimer.

[21] Appl. No.: 09/130,946

[22] Filed: Aug. 7, 1998

[51] Int. Cl.⁷ ............................ C08G 18/28; C08G 18/70
[52] U.S. Cl. ........................ 528/71; 528/76; 528/56; 528/59; 528/61; 528/65; 528/85; 524/589; 524/590; 521/65; 521/67; 521/134; 521/137; 521/155; 521/159; 521/911; 264/45.9; 264/46.8
[58] Field of Search .................... 528/71, 76, 56, 528/59, 61, 65, 85; 524/589, 590; 521/65, 67, 134, 137, 155, 159, 911; 264/45.9, 46.8

[56] References Cited

U.S. PATENT DOCUMENTS

| | | | |
|---|---|---|---|
| 3,725,308 | 4/1973 | Ostolski | 252/513 |
| 4,231,901 | 11/1980 | Berbeco | 252/511 |
| 4,257,699 | 3/1981 | Lentz . | |
| 4,393,718 | 7/1983 | Hoppe et al. | 525/490 |
| 4,568,485 | 2/1986 | Jonas et al. | 252/518 |
| 4,581,158 | 4/1986 | Lin | 252/511 |
| 4,617,325 | 10/1986 | Knobel | 521/105 |
| 4,618,630 | 10/1986 | Knobel et al. . | |
| 4,652,399 | 3/1987 | Herweh | 252/518 |
| 4,654,279 | 3/1987 | Bauer et al. | 429/192 |
| 4,710,015 | 12/1987 | Takeda et al. . | |
| 4,762,899 | 8/1988 | Shikinami . | |
| 4,806,571 | 2/1989 | Knobel et al. . | |
| 4,886,626 | 12/1989 | Cope et al. | 252/500 |
| 5,009,925 | 4/1991 | Grigat et al. | 252/500 |
| 5,077,330 | 12/1991 | Ehrhart et al. | 524/314 |
| 5,110,669 | 5/1992 | Knobel et al. . | |
| 5,156,915 | 10/1992 | Wilson et al. . | |
| 5,212,032 | 5/1993 | Wilson et al. . | |
| 5,217,838 | 6/1993 | Wilson et al. . | |
| 5,248,560 | 9/1993 | Baker et al. . | |
| 5,250,357 | 10/1993 | Wilson et al. . | |
| 5,639,847 | 6/1997 | Chiang et al. . | |
| 5,830,541 | 11/1998 | Carswell et al. . | |
| 5,898,057 | 4/1999 | Chiang et al. | 528/71 |

FOREIGN PATENT DOCUMENTS

| | | |
|---|---|---|
| 0 122 633 | 10/1984 | European Pat. Off. . |
| 0 521 826 A1 | 1/1993 | European Pat. Off. . |
| 93302947 | 4/1993 | European Pat. Off. . |
| 28 45 674 A1 | 5/1980 | Germany . |
| 49-97845 | 9/1974 | Japan . |
| 49-97846 | 9/1974 | Japan . |
| 49-97847 | 9/1974 | Japan . |
| 57-30319 | 2/1982 | Japan . |
| 60-25159 | 2/1985 | Japan . |
| 60-189229 | 9/1985 | Japan . |
| 61-264053 | 11/1985 | Japan . |
| 62-256990 | 11/1987 | Japan . |
| 63-48561 | 3/1988 | Japan . |
| 1-109663 | 4/1989 | Japan . |
| 2-166158 | 6/1990 | Japan . |
| 205038 | 5/1993 | Taiwan . |
| WO 96/37542 | 11/1996 | WIPO . |

OTHER PUBLICATIONS

Brunner, "Leitklebstoffe: Die sinnvolle Alternative", Adhasion, 31(10):9–13, (1987).

Chiang, "Synthesis and Electrical Conductivity Measurement of Polyphenylacetylene and its Derivatives", (1980).

Furukawa et al., "Mechanical properties and electrical conductivity of carbon, polyurethane composites", Japanese Abstract; CA113(18):153610a (1990).

Jasiulek et al., "Stromleitende Klebstoffe–Verlauf der Elektrizitatsieitung", Adhasion 24(4):94–99, (1980).

Killis et al., "Ionic Conductivity of Poly–ethol–polyurethane networks containing Alkale metal salts. An analysis of the concentration effect", (Abstract) CA100(6):35112y (1984).

Yoneyan et al., "Conductive adhesives for microelectronics", Kogyo Zairyo, 31(11):101–106, (1983) English abstract provided.

*Primary Examiner*—Duc Truong
*Attorney, Agent, or Firm*—Fish & Richardson P.C.

[57] ABSTRACT

A conductive quasi-solution useful for making a homogeneously conductive single-phase polyurethane, comprising a transition metal salt, a carrier solution, and a dispersing agent, wherein said conductive quasi-solution has a transition metal salt concentration between 10 and 30% by weight, and methods of making thermoset and thermoplastic polyurethane polymers therewith.

27 Claims, No Drawings

PREPARATION OF CONDUCTIVE POLYURETHANES USING A CONDUCTIVE QUASI-SOLUTION

BACKGROUND OF THE INVENTION

Certain applications of polymers require conductive, semi-conductive, or static charge-dissipating properties.

Electrically conductive polymer-products have been made by mixing an electrically conductive material into the polymer during formation. Examples of such electrically conductive materials include powders such as silver, copper, nickel, carbon black, and graphite; and ionizable metal salts such as alkali metal tetraorganoborides. To provide satisfactory conductive properties, the amount of conductive powder in a conductive material can be as high as 10–40% by weight, which can affect the thermal and mechanical properties of the polymer. Uniform high conductivity requires uniform distribution of the conductive material throughout the polymer bulk.

SUMMARY OF THE INVENTION

In one aspect, the invention features a conductive quasi-solution useful for making a homogeneously conductive single-phase polyurethane. The quasi-solution includes between 10% and 30% by weight of a transition metal salt, a carrier solution, a dispersing agent. The carrier solution includes a polyol, a polyamine, or a flame retardant. In preferred embodiments, the carrier solution includes a flame retardant.

In another aspect, the invention features a method of making a homogeneously conductive single-phase polyurethane, including the steps of preparing a conductive quasi-solution and mixing an amount of the conductive quasi-solution with a diisocyanate and a polyurethane precursor to form a homogeneously conductive single-phase polyurethane (i.e., a solid solution). The polyurethane precursor is selected from polyols and polyamines.

Mixing is accomplished according to either a conventional reaction injection molding process, or a conventional thermoplastic polyurethane production process.

The conductive thermoset and thermoplastic polyurethanes have many applications. Examples include coated integrated circuit boards, car body parts, especially those which are to have a painted (baked) surface, such as bumpers and side panels; and durable carrying cases or other accessories in the electronics (e.g., computer) field for which dissipation of static charge is desirable.

The transition metal salt provides conductive properties to the polyurethane. As used herein, homogeneously conductive means that conductivity is essentially uniform across the surface and throughout the volume of the bulk polyurethane, due to the uniform distribution of fully-dissolved transition metal salts throughout the polymer. The polymer is thus a single-phase solid solution of polymer and dissolved transition metal salts, with an absence of transition metal salt particles. The methods of the invention produce single-phase conductive polyurethanes, which are therefore homogeneously conductive.

Other features and advantages of the invention will be apparent from the detailed description, and from the claims.

DETAILED DESCRIPTION OF THE INVENTION

The invention generally features the use of a conductive quasi-solution to make a homogeneously conductive, single phase polyurethane. The conductive quasi-solution is a dispersion including a transition metal cation, a dispersing agent, and a carrier. A conductive quasi-solution has both dissolved and undissolved transition metal salt, the maximum diameter of undissolved particles being 0.5 $\mu$m, and preferably 0.1 $\mu$m.

The invention resides, in part, in the discovery that a quasi-solution of transition metal salts will produce a conductive single-phase polyurethane product. This product, whether formed by reaction injection molding or conventional thermoplastic polyurethane production, is a solid solution, rather than a dispersion of undissolved transition metal salts in the polymer. Upon mixing, the undissolved transition metal particles dissolve into the forming polymer. For example, mixing a copper (II) chloride quasi-solution (a brown dispersion with undissolved copper salt particles) with the urethane precursor(s) results in a clear, dark green solution without any precipitated or undissolved copper salt particles. Similarly, mixing an iron (III) chloride quasi-solution (a dark grey dispersion) with the urethane precursor (s) results in a clear, light brown solution without any precipitated or undissolved particles of iron salt. The reaction of the precursor with a diisocyanate forms a uniform, light green polyurethane product where a copper quasi-solution is used; a uniform light brown polyurethane product is formed where an iron quasi-solution is used. These color changes indicate that the polyurethane product is a solid solution, i.e., a homogeneous, single-phase polymer.

In addition, the transition metal cations form d-orbital complexes with nucleophilic oxygen (i.e., carbonyl) and nitrogen atoms. Such complexes form bridged networks between different polyurethane polymer molecules, which improves uniformity and conductivity.

Transition Metal Salt

A transition metal salt is capable of carrying or conducting an electric charge. According to the invention, a transition metal salt includes a transition metal cation and one or more counter-anions to form a neutral salt. Each counter-anion may be any anion that does not interfere with the homogeneity or semi-conductivity of the final polymer product. Examples of transition metal cations include Cu (II), Co (II), Zn (II), Ni (II), Fe (II), and Fe (III). Fe (III) and Cu (II) are preferred. Examples of counter-anions include fluoride, chloride, bromide, iodide, cyanide, thiocyanate, acetate, lactate, phosphate, and tartrate. Thiocyanate, bromide, chloride, and acetate are preferred. Thus, examples of transition metal salts include $CuCl_2$, $CuBr_2$, $Cu(CH_3COO)_2$, $Cu(SCN)_2$, $FeBr_3$, $Fe(SCN)_3$, $FeCl_2$, $CuCl_2$, and $Fe(CH_3COO)_3$. Transition metal salts are available commercially from, e.g., Aldrich Chemical Co. (Milwaukee, Wis.).

The conductive quasi-solution preferably has a transition metal salt concentration (w/w in carrier and dispersing agent) of between 10 and 30%, and more preferably between 15 and 25%. Generally, in the absence of a dispersing agent, the solubility of a transition metal salt in a carrier is between 5 and 10% (w/w). The concentration (w/w) of transition metal salts in the final product is between 0.02 and 1.0%, and is preferably between 0.04 and 0.2% (see, e.g., Example 12). Thus, the mole percent of transition metal salts in the final product is between $1.52\times10^{-4}$ and $7.4\times10^{-3}$ mole percent, and preferably between $3.0\times10^{-4}$ and $1.5\times10^{-3}$ mole percent. In some embodiments, more than one transition metal salts are used; as a result, more than one transition metal cation or more than one counter-anion is present in the conductive quasi-solution.

Carrier Solution

According to the invention, a carrier solution is one or more organic solvents, the combination solution being stable at high temperature. Such a temperature-stable non-aqueous liquid is characterized by a high boiling point and a low vapor pressure. A high boiling point is a boiling point of at least 350° F., and preferably at least 500° F. A low vapor pressure is a vapor pressure of no more than 50 mm Hg at 110° C. A low vapor pressure is also characterized by the visual absence of white smoke at 300° F. Examples of carrier solutions include flame retardants such as tri(haloalkyl) phosphates, and preferably tri(chloro-ethyl)phosphate ("Fyrol® CEF," Akzo Chemical Corp., Chicago, Ill.) and tri(β-chloroisopropyl)phosphate ("PCF"); polyamines such as Polamine® 650, Polamine® 1000, and Polamine® 2000 (Air Products, Allentown, Pa.); and polyols such as polypropylglycol ("PPG"), Terathane® 650, Terathane® 1000, Terathane® 2000, Terathane® 2900, Terathane® CL-2000 (Du Pont de Nemours, Wilimington, Del.), and Pluracol® Polyol 924, Pluracol® Polyol 538, and Pluracol® Polyol 774 (BASF Corp., Parsippany, N.J.), and butanediol XB (GAF Corp., Wayne, N.J.)

In some embodiments, more than one solvent is present in the conductive quasi-solution, such as the following carrier combinations: a polyol and a polyamine; two polyols; two polyamines; a flame retardant and a polyol; a flame retardant and a polyamine; or a flame retardant, a polyol, and a polyamine.

Dispersing Agent

According to the invention, a dispersing agent is a non-ionic surfactant which acts to stabilize the metal salt in the conductive quasi-solution before use in a reaction injection molding process. After mixing, the dispersing agent also improves solubility of the transition metal salt, improves uniform mixing, and thus improves the conductive homogeneity of the final product. Stabilization of the conductive quasi-solution includes increasing the solubility of the transition metal salt without increasing the percent of carrier. Examples of dispersing agents include DC 190 and DC 193 (Dow Corning Corp., Midland, Mich.), DABCO™ DC 5418 (Air Products Co.) and RC Dispersant WM (Rhein Chemie Corp., Trenton, N.J.). Dispersing agents are present in the quasi-solution at a concentration between 0.5 and 5%, and preferably 1 and 3% (w/w).

Mixing Process

The conductive quasi-solution of the invention may be used in either a two stream process (streams A and B) or a three stream process (streams A, B, and C) to produce a molded homogeneously conductive polyurethane form. The mixing step may be part of either a conventional reaction injection molding process or a conventional production method of making thermoplastic polyurethane. A diisocyanate can be in prepolymer form (i.e., partially cured with a polyol or polyamine) or pure form, such as methylene diisocyanate (MDI) or toluene diisocyanate (TDI) (BASF Corp.).

In a two stream process, stream A includes a diisocyanate in either a prepolymer form such as the commercially available Bayflex® 110-25A (Bayer Corp, Pittsburgh, Pa.) or pure form, such as Isocyanate® 76 and Isocyanate® 227 from BASF. Stream B includes a conductive quasi-solution at a concentration between 0.2 to 2.0% by weight, and a polyurethane precursor such as a polyol or a polyamine in a solvent such as Bayflex® 110-35B, IMR (Bayer Corp.). Stream B also may include a catalyst such as an amine catalyst, a tin catalyst, or a bismuth catalyst, in a concentration between 0.01 and 0.5%, and preferably between 0.02 and 0.3% by weight with respect to the total amount of polyol and polyamine. Examples of catalysts include DABCO™ 33-LV, DABCO™ T-12 and DABCO™ T-9 (Air Product Co.) and Fomrez® UL-32 (Witco, New York, N.Y.).

In a three stream process, stream A includes a diisocyanate as above. Stream B includes a polyurethane precursor such as a polyol or a polyamine. In general, the total concentration of polyol and polyamine is at least 95%, the remainder being additives such as lubricants (e.g., internal mold release materials), catalysts, pigments, mineral additives (e.g., glass fibers, iron oxide, carbon black, or graphite). Stream C includes the conductive quasi-solution. Stream C may also include additives such as pigment.

In either process, the streams are mixed at a specified flow rate ratio, temperature, and pressure at the mixing head and rapidly injected into the mold, e.g., within 1 or 2 seconds. A person of skill in the art will easily be able to determine the specific ratios, temperatures, and pressures to be used. See, e.g., Example 12.

In general, the conductive quasi-solution of the invention has a very short pot life (e.g., less than 5 seconds). After contact with a polyurethane precursor such as a polyol or a polyamine or a combination thereof, the previously-undissolved transition metal salt particles in the conductive quasi-solution completely dissolve. Moreover, once the streams are in contact with each other, a single-phase solid solution polyurethane is formed. The concentration (w/w) of the quasi-solution in the final product is between 0.1 and 5% and preferably between 0.2 and 1.0%.

Without further elaboration, the present invention can be utilized to its fullest extent based on the description herein. The following specific examples are offered by way of illustration, and not by way of limitation.

EXAMPLES

Example 1

Fyrol CEF (tri-(β-chloroethyl)phosphate (2475 g, Akzo Corp, Chicago, Ill.) was added to a four liter flask. RC Dispersant WM (125 g, Rhein Chemie Corp., Trenton, N.J.) was slowly added to the Fyrol® CEF with mechanical stirring (400 rpm), followed by slow addition of 650 g of $CuCl_2$ (Aldrich Chemical, Milwaukee, Wis.) over a period of 6 hours with mechanical mixing at 150° F. A uniform, conductive quasi-solution was formed, having a transition metal salt concentration of 20% by weight.

Example 2

Procedure according to Example 1, except 650 g of $FeCl_3$ was added, instead of 650 g $CuCl_2$.

Example 3

Procedure according to Example 1, except 325 g of $FeCl_3$ and 325 g $CuCl_2$ were added, instead of 650 g $CuCl_2$.

Example 4

Procedure according to Example 1, except tri(β-chloroisopropyl)phosphate was added instead of (tri-(β-chloroethyl)phosphate.

Example 5

Procedure according to Example 1, except a polyol solution was added instead of Fyrol® CEF, for use in RIM.

Example 6

Procedure according to Example 1, except a polyamine solution was added instead of Fyrol® CEF, for use in RIM.

Example 7

Procedure according to Example 1, except a solution including both polyamine and polyol was added instead of Fyrol® CEF, for use in RIM.

Example 8

Procedure according to Example 1, except a thermoplastic polyol solution was added instead of Fyrol® CEF, for use in making a thermoplastic polyurethane.

Example 9

Procedure according to Example 1, except a thermoplastic polyamine solution was added instead of Fyrol® CEF, for use in making a thermoplastic polyurethane.

Example 10

Procedure according to Example 1, except a solution including both polyamine and polyol was added instead of Fyrol® CEF, for use in making a thermoplastic polyurethane.

Corp., Pittsburgh, Pa. The conductive quasi-solution of Example 1 was premixed with part B to form a conductive polyurethane precursor solution. An Admiral 2640-2 high pressure, high temperature RIM machine was used to form a plaque having a transition metal salt concentration in the final product of 0.25%, 0.50%, and 0.75%.

The process parameters were as follows: 2.0 lb/sec injection rate, 1.20 sec injection time, 45 sec cure time, Part A (diisocyanate) temperature 125° F., Part B (polyol or polyamine) temperature 135° F., 155° F. mold temperature, 1980 psi mix pressure for part A, 1920 psi mix pressure for part B, tank pressures for both A and B were 24 psi. The plaque size was 22" by 28". A ChemTrend® 2006 mold release, zinc stearate aqueous solution wash soap was used. The plaque was cured at 250° F. for 1 hour and washed with the zinc stearate soap. Electrical paint was applied at 85 kV with a gun speed of 30 ips. A superior, uniform paint coat was achieved (see Table I).

TABLE I

Physical Properties of Plaque

| MPC con. (%) | Specif. gravity (g/cc) | Tensile strength (psi) | Flexural modulus (ksi) | Elongation (%) Parallel | Elongation (%) Perpend | Resistivity ohm-cm volume | Resistivity ohm/sq surface |
|---|---|---|---|---|---|---|---|
| .00 | 1.21 | 2808 | 103.6 | 108 | 134 | 4.9E13 | 2.9E15 |
| .25 | 1.17 | 2719 | 92.1 | 89 | 122 | 4.3E11 | 2.7E12 |
| .50 | 1.15 | 2690 | 90.7 | 89 | 114 | 8.4E10 | 6.2E11 |
| .75 | 1.17 | 2876 | 87.5 | 93 | 113 | 2.2E10 | 1.6E11 |
| 1.8 | | | | | | 5.0E8 | 2.8E10 |

Example 11

Procedure according to Example 1, except one or more transition metal salts selected from $CuBr_2$, $Cu(CH_3COO)_2$, $Cu(SCN)_2$, $FeBr_3$, $Fe(CH_3COO)_3$, $Fe(SCN)_3$ $FeCl_3$, and $CuCl_2$.

Example 12

Bayflex® 110-35A, part A, and Bayflex® 110-35B,IMR or Bayflex® 110-35B, part B were obtained from Bayer

Example 13

Procedure according to Example 12, except the following was used: part A (Bayflex® 110-25A); part B (Bayflex® 110-25B premixed with a conductive quasi-solution having a 10% by weight $CuCl_2$ transition metal salt concentration). The mixing time was 1.2 seconds at 150° F.; the material was postcured for 1 hour at 260–270° F., and then electrically painted to yield a uniform paint coat with an excellent appearance and good fastness (see Table II).

TABLE II

Physical Properties of Plaque

| Sold (%) | MPC addi (g) | Bayflex 110-25B (g) | Volume resist (ohm-cm) | Surface resist (ohm/sq) | Hardness (D) | Tensile strength psi | Tear str. pli | Elong (%) |
|---|---|---|---|---|---|---|---|---|
| 0 | 0 | 100 | 5.0E12 | 2.0E13 | 45D | 2460 | 408 | 187 |
| 1.2 | 1.8 | 100 | 2.0E9 | 1.1E11 | 53D | 3110 | 405 | 214 |
| 3.1 | 4.6 | 100 | 5.0E8 | 8.0E10 | 50D | 2888 | 337 | 160 |
| 6.1 | 9.0 | 100 | 1.5E8 | 6.0E10 | 47D | 2351 | 346 | 103 |
| 16.2 | 24.0 | 100 | 6.9E7 | 2.3E10 | 37D | 1670 | 276 | 87 |

Example 14

Thermoplastic polyurethane (TPU) is made by mixing a conductive quasi-solution (0.1 to 10%) into a polyol or polyamine to form a conductive precursor solution. The precursor solution is reacted with pure diisocyanate at a temperature between 100 and 240° F. to form thermoplastic polyurethane. The polyurethane material is completely cured at 200° F. for 12 hours and cooled to room temperature. After cooling, the material is extruded and formed into pellets for packing. The urethane product is semiconductive, and useful for static charge dissipation with a volume resistivity between about E8 and E10 ohm-cm.

OTHER EMBODIMENTS

Other embodiments are within the scope of the following claims.

What is claimed is:

1. A method of making a homogeneously conductive single-phase thermoplastic polyurethane, comprising mixing, with heating, a combination containing a transition metal salt, a dispersing agent, and a solvent comprising a flame retardant, a polyol, or a polyamine to provide a conductive quasi-solution having undissolved particles of said transition metal salt in said solvent, and combining said conductive quasi-solution with a thermoplastic polyurethane precursor and a diisocyanate to provide a homogeneously conductive single-phase thermoplastic polyurethane containing said transition metal salt.

2. The method of claim 1, wherein said transition metal salt comprises a transition metal selected from Cu (II), Fe (III), Ni (II), Zn (II), and Co (II), and a counter-anion selected from acetate, tartrate, lactate, phosphate, oxalate, fluoride, chloride, bromide, iodide, thiocyanate, and cyanide.

3. The method of claim 2, wherein said transition metal salt comprises Fe (III) or Cu (II).

4. The method of claim 2, wherein said transition metal is Cu (II) or Fe (III), and said counter-anions are independently selected from acetate, thiocyanate, chloride, or bromide.

5. The method of claim 1, wherein there are at least two transition metal salts in said conductive quasi-solution.

6. The method of claim 5, wherein said transition metal salts comprise Fe (III) and Cu (II).

7. The method of claim 5, wherein said transition metal salt comprises copper chloride.

8. The method of claim 1, wherein said combination contains between 10% and 30% by weight of said transition metal salt.

9. The method of claim 1, wherein said combination contains between 15% and 25% by weight of said transition metal salt.

10. The method of claim 1, wherein said dispersing agent comprises a non-ionic surfactant.

11. The method of claim 1, wherein the concentration of said dispersing agent in said conductive quasi-solution is between 0.5% and 5% by weight.

12. The method of claim 1, wherein the concentration of said dispersing agent in said conductive quasi-solution is between 1% and 3% by weight.

13. The method of claim 1, wherein said solvent comprises a flame retardant comprising a phosphate haloalkyl ester or a diphosphate haloalkyl ester.

14. The method of claim 1, wherein said solvent comprises a polyol.

15. The method of claim 1, wherein said solvent comprises a polyamine.

16. The method of claim 1, wherein said solvent comprises a combination of a polyol and a polyamine.

17. The method of claim 1, wherein said combining step includes combining said conductive quasi-solution with a thermoplastic polyurethane precursor to provide a conductive thermoplastic polyurethane precursor, and combining a first stream comprising said conductive thermoplastic polyurethane precursor and a second stream comprising said diisocyanate to provide the homogeneously conductive single-phase thermoplastic polyurethane.

18. The method of claim 17, wherein said transition metal salt is fully dissolved in said conductive thermoplastic polyurethane precursor.

19. The method of claim 17, wherein said quasi-solution in said conductive thermoplastic polyurethane precursor is about 0.1 to 10% by weight.

20. The method of claim 17, wherein said first stream is combined with said second stream at a temperature between 100 and 240° F.

21. The method of claim 1, further comprising postcuring the thermoplastic polyurethane after the combining step.

22. The method of claim 17, wherein said conductive thermoplastic polyurethane precursor contains an amine catalyst, a tin catalyst, or a bismuth catalyst.

23. The method of claim 22, wherein said catalyst is between 0.01 and 0.5% by weight with respect to the total amount of said thermoplastic polyurethane precursor.

24. The method of claim 22, wherein said catalyst is between 0.02 and 0.3% by weight with respect to the total amount of said thermoplastic polyurethane precursor.

25. The method of claim 1, wherein said homogeneously conductive single-phase thermoplastic polyurethane contains between 0.02% and 1% of the transition metal salt by weight.

26. The method of claim 1, wherein said homogeneously conductive single-phase thermoplastic polyurethane contains between 0.04% and 0.2% of said transition metal salt by weight.

27. The method of claim 1, wherein said undissolved particles have a maximum diameter of from about 0.1 $\mu$m to about 0.5 $\mu$m.

* * * * *

UNITED STATES PATENT AND TRADEMARK OFFICE
CERTIFICATE OF CORRECTION

PATENT NO. : 6,111,051     Page 1 of 1
DATED : August 29, 2000
INVENTOR(S) : Albert C. Chiang and John A. Roderick It is certified that error appears in the above-identified patent and that said Letters Patent is hereby corrected as shown below:

Title page,
Column 1, delete [4,393,718] and insert -- 4,393,719 --

Signed and Sealed this

Twenty-third Day of October, 2001

Attest:

*Nicholas P. Godici*

NICHOLAS P. GODICI
*Attesting Officer*     *Acting Director of the United States Patent and Trademark Office*